(12) United States Patent
Tamaki

(10) Patent No.: US 8,121,759 B2
(45) Date of Patent: Feb. 21, 2012

(54) MOTOR-DRIVEN POWER STEERING APPARATUS

(75) Inventor: Akihiro Tamaki, Tochigi (JP)

(73) Assignee: Showa Corporation, Gyoda-shi (JP)

( * ) Notice: Subject to any disclaimer, the term of this patent is extended or adjusted under 35 U.S.C. 154(b) by 1194 days.

(21) Appl. No.: 11/855,994

(22) Filed: Sep. 14, 2007

(65) Prior Publication Data

US 2008/0243338 A1 Oct. 2, 2008

(30) Foreign Application Priority Data

Mar. 26, 2007 (JP) ................. 2007-078202

(51) Int. Cl.
| G06F 17/00 | (2006.01) |
| G06F 19/00 | (2011.01) |
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| B62D 5/04 | (2006.01) |

(52) U.S. Cl. ............ 701/41; 701/42; 180/443; 180/444; 180/446

(58) Field of Classification Search ............... 701/41, 701/42; 180/443, 444, 446
See application file for complete search history.

(56) References Cited

U.S. PATENT DOCUMENTS

| 5,740,040 A * | 4/1998 | Kifuku et al. | 701/41 |
| 5,774,819 A * | 6/1998 | Yamamoto et al. | 701/41 |
| 6,148,950 A * | 11/2000 | Mukai et al. | 180/446 |
| 6,505,702 B1 * | 1/2003 | Shinmura et al. | 180/446 |
| 6,727,671 B2 * | 4/2004 | Ito et al. | 318/432 |
| 6,782,968 B2 * | 8/2004 | Sakugawa | 180/446 |
| 2002/0023798 A1 * | 2/2002 | Amakusa et al. | 180/446 |

FOREIGN PATENT DOCUMENTS

| DE | 10044205 | 5/2001 |
| EP | 1749730 | 2/2007 |
| JP | 5-112251 | 5/1993 |
| JP | 3418098 | 6/2003 |

OTHER PUBLICATIONS

European Search Report; counterpart EPO Application No. 07018510.3-1523; issued Jul. 9, 2008.

* cited by examiner

*Primary Examiner* — John Nguyen
*Assistant Examiner* — Nicholas Kiswanto
(74) *Attorney, Agent, or Firm* — Babcock IP, PLLC

(57) ABSTRACT

A motor-driven power steering apparatus is provided with a sub control system including a map memory means storing a first window time setting map M1 and a second window time setting map M2 in which a window time is set shorter, a window time setting map selecting means selecting the first window time setting map M1 at a time when a torque change amount dT and a current change amount dIm are both smaller than respective predetermined change amounts, and selecting the second window time setting map M2 in the other cases, a window time deciding means collating a point coordinate of a combination of a steering torque and a motor current with the selected window time setting map so as to decide a window time, and a motor drive stop determining means determining the motor drive stop in the case that the point coordinate exists in a region corresponding to the decided window time for the window time, and when a motor drive stop determining means determines the motor drive stop, the drive of the motor controlled so as to be driven by a main control system is stopped.

21 Claims, 5 Drawing Sheets

(1) FIRST WINDOW TIME SETTING MAP M1

(2) SECOND WINDOW TIME SETTING MAP M2

MOTOR-DRIVEN POWER STEERING APPARATUS

BACKGROUND OF THE INVENTION

1. Field of the Invention

The present invention relates to a motor-driven power steering apparatus assisting a steering force of a driver.

2. Description of the Related Art

Since a motor-driven power steering apparatus is structured such as to assist a steering force of a driver on the basis of a power of an electric motor, it is normal that a direction of a steering torque generated by a steering operation of the driver is identical to a direction of an assist torque generated by driving the electric motor, and this state is a normal state. Accordingly, when there is generated a situation that the direction of the steering torque is different from the direction of the assist torque, there can be considered an abnormality of a system of a control system constituted by a central processing unit (CPU) or the like, and there is an example (for example, refer to Japanese Patent Application Laid-Open No. 5-112251 (patent document 1)) structured such as to be provided with a second control system constituted by a sub CPU independently for coping with the situation mentioned above.

The patent document 1 discloses a control for inhibiting a drive of a motor in the case that a state in which the direction of the steering torque is different from the direction of the assist torque carries over for a predetermined time (a window time) or more.

As mentioned above, the direction of the steering torque is generally identical to the direction of the assist torque, however, there is a case of controlling in such a manner as to apply an assist torque in an inverse direction to the direction of the steering torque for holding a steering damper effect at a time of turning back the steering operation.

Since the control in the patent document 1 mentioned above makes it a condition that the control is carried over for the predetermined time or more for inhibiting the drive or the motor, it is possible to hold the steering damper effect in some degree for this predetermined time, however, in order to suitably obtain the steering damper effect in correspondence to the state, there has been separately proposed such a control as to freely vary the predetermined time on the basis of a magnitude of the steeling torque (for example, refer to Japanese Patent No. 3418098 (patent document 2)).

According to the control of the patent document 2, a long predetermined time is set for obtaining a sufficient steering damper effect at a time when the steering torque is small. If the situation occurs that the direction of the steering torque is different from the direction of the assist torque as a system abnormality, an extra drive of the motor which does not work even as a damper, carries over in this comparatively long predetermined time. Further, it appears as an unnatural behavior of the steering, particularly in the case that the torque change is large or the like.

SUMMARY OF THE INVENTION

By taking the point mentioned above into consideration, and an object of the present invention is to provide a motor-driven power steering apparatus which can anticipate a steering damper effect and can prevent an unnatural behavior of a steering in the case that the system status is abnormal or the like.

The present invention relates to a motor-driven power steering apparatus provided with a steering assist control means calculating an assist base current value on the basis of a steering torque and a vehicle speed, and a damper current computing means computing a damper current on the basis of at least a change amount of the steering torque, and constructing a main control system assisting a human powered steering input by controlling so as to drive a motor in accordance with an assist target current determined on the basis of a current obtained by adding the damper current to the assist base current. The motor-driven power steering apparatus is provided with a sub control system, comprising: a map memory means storing a first window time setting map and a second window time setting map in which a window time is set shorter, as a window time setting map corresponding to a coordinate map having two variables including a steering torque and a motor current and in which a window time for stopping the motor drive is set within a predetermined motor drive stop region; a torque change amount computing means calculating a torque change amount by differentiating the steering torque; a current change amount computing means calculating a current change amount by differentiating the motor current; a window time setting map selecting means selecting the first window time setting map at a time when the torque change amount and the current change amount are both smaller than respective predetermined change amounts, and selecting the second window time setting map in the other cases; a window time deciding means collating a point coordinate of a combination of the steering torque and the motor current with the window time setting map selected by the window time setting map selecting means so as to extract and decide the corresponding window time in the case that the point coordinate exists in the motor drive stop region; and a motor drive stop determining means determining the motor drive stop in the case that the point coordinate of the combination of the steering torque and the motor current continuously exists in the region corresponding to the decided window time for the window time. When the motor drive stop determining means of the sub control system determines the motor drive stop, the drive of the motor controlled so as to be driven by the main control system is stopped.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

A description will be given below of embodiments in accordance with the present invention with reference to FIGS. 1 to 5.

Figure 1:
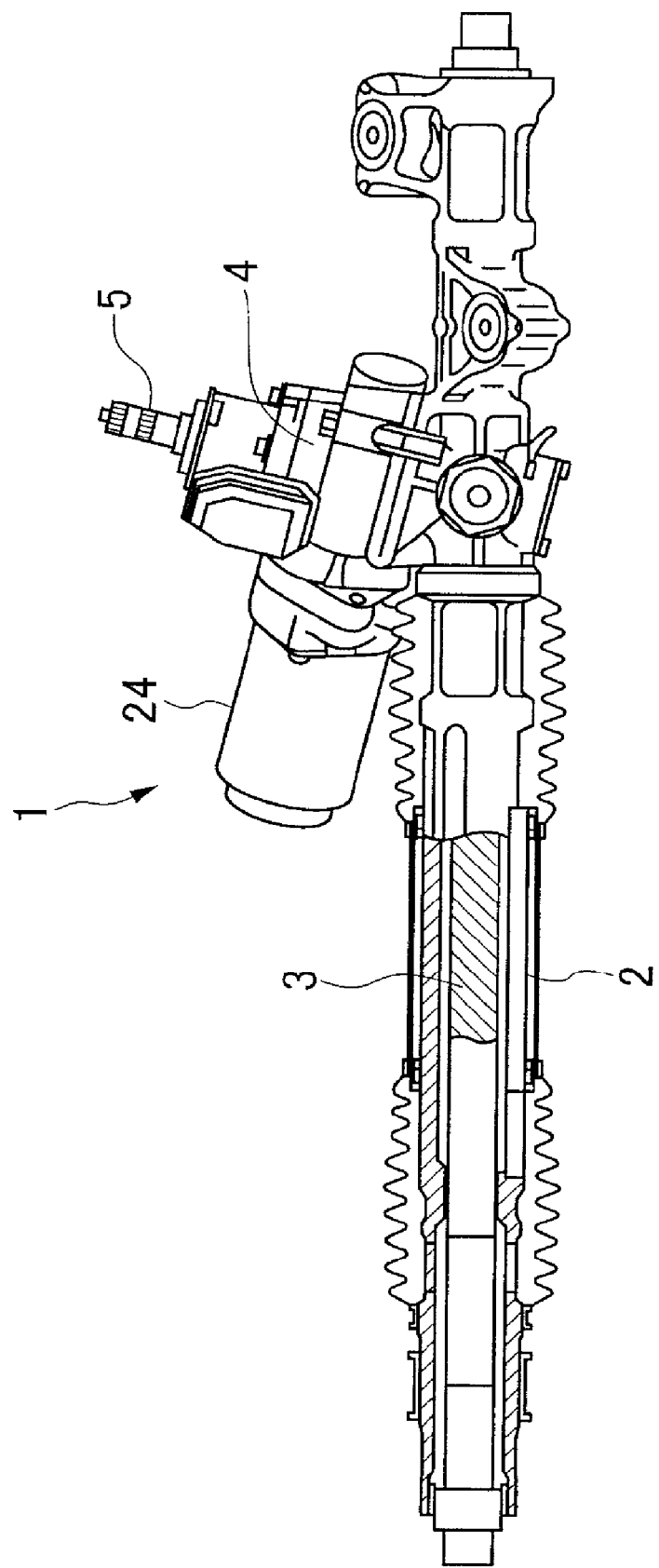
FIG. 1 is a schematic rear elevational view of a whole of a motor-driven power steering apparatus in accordance with an embodiment of the present invention.

FIG. 1 shows a skeleton back elevational view of an entire of a motor-driven power steering apparatus 1 in accordance with an embodiment of the present invention.

The motor-driven power steering apparatus 1 is structured such that a rack shaft 3 is accommodated within an approximately cylindrical rack housing 2 directed in a lateral direction of the vehicle (coinciding with a lateral direction in FIG. 1) so as to be slidable in a direction of a lateral axis.

Tie rods are respectively coupled to both end portions of the rack shaft 3 protruding from both end openings of the rack housing 2 via joints, the tie rods are moved based on a movement of the rack shaft 3, and a steered wheel of the vehicle is steered via a steering mechanism.

A steering gear box 4 is provided in a right end portion of the rack housing 2.

Figure 2:
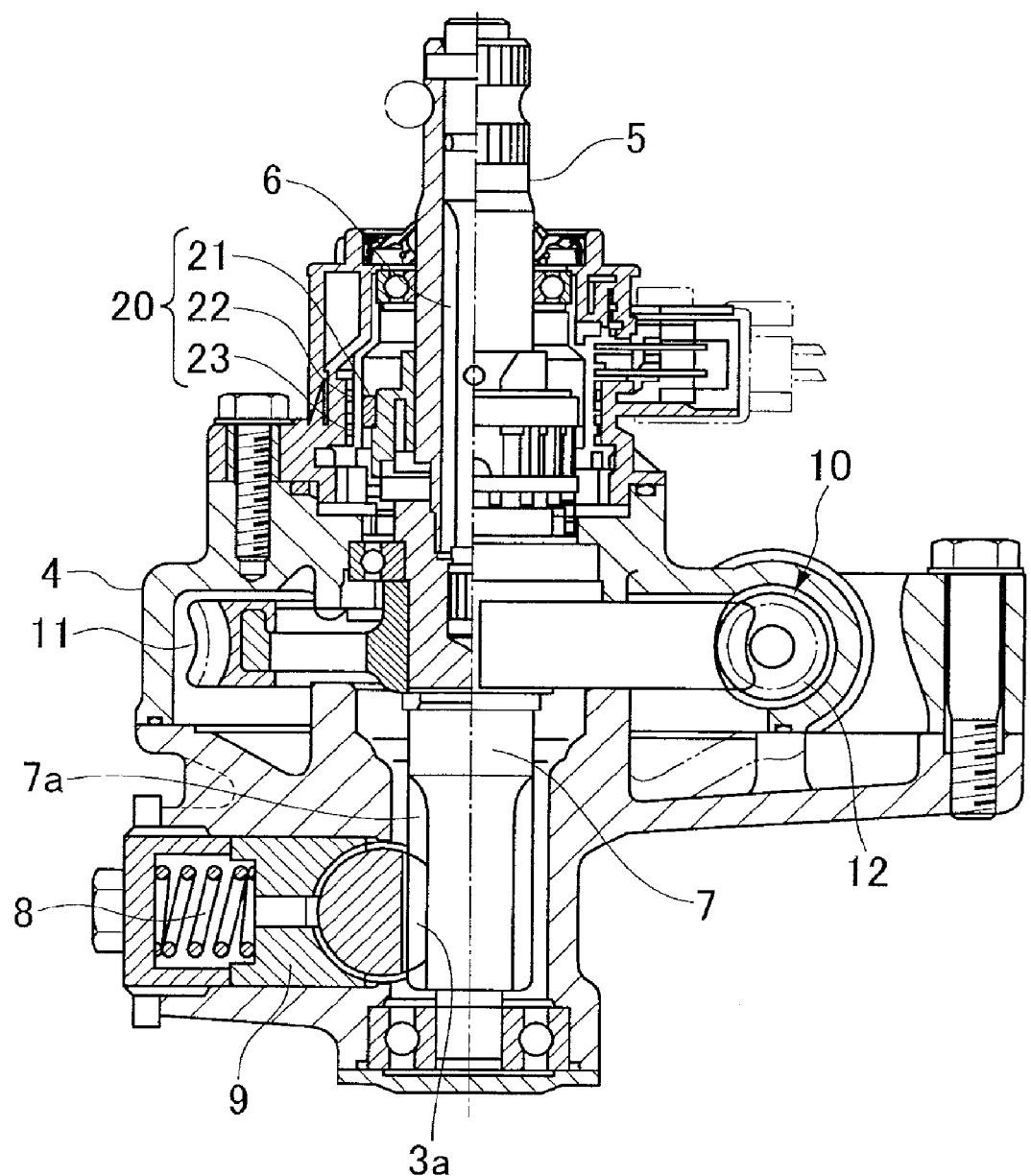
FIG. 2 is a cross sectional view showing a structure within a steering gear box.

An input shaft 5 is rotatably pivoted to the steering gear box 4 via a bearing. The input shaft 5 is coupled to a steering shaft to which a steering wheel (not shown) is integrally attached, via a joint. The input shaft 5 is coupled to a pinion shaft 7 via a torsion bar 6 within the steering gear box 4 so as to be freely twisted relatively as shown in FIG. 2.

A spiral gear 7a of the steering pinion shaft 7 is engaged with a rack gear 3a of the rack shaft 3.

Accordingly, a steering force transmitted to the input shaft 5 based on a rotating operation of the steering wheel rotates the steering pinion shaft 7 via the torsion bar 6 and slides the rack shaft 3 in a direction of a lateral axis based on an engagement between the spiral gear 7a of the steering pinion shaft 7 and the rack gear 3a.

The rack shaft 3 is pressed from a back side by a rack guide 9 energized by a rack guide spring 8.

An assist motor 24 is attached to an upper portion of the steering gear box 4, and a worm speed reducing mechanism 10 is structured within the steering gear box 4. The worm speed reducing mechanism 10 reduces a driving force of the assist motor 24 so as to transmit to the steering pinion shaft 7.

The worm speed reducing mechanism 10 is structured such that a worm 12 coaxially coupled to a drive shaft of the assist motor 24 is engaged with a worm wheel 11 fitted and attached to an upper portion of the steering pinion shaft 7.

The steering operation is assisted by applying the driving force of the assist motor 24 to the steering pinion shaft 7 via the worm speed reducing mechanism 10.

In this case, the assist motor 24 is provided with a rotating angle sensor 27 such as a rotary encoder, a resolver or the like directly detecting a rotation of a rotational drive shaft thereof.

A steering torque sensor 20 is provided in a further upper side of the worm speed reducing mechanism 10.

A steering torque T is detected by converting torsion of the torsion bar 6 into a movement in an axial direction of a core 21, and changing the movement of the core 21 to an inductance change of coils 22 and 23.

In this case, it is possible to employ a torque sensor optically detecting the torsion of the torsion bar 6.

The assist motor 24 controlled on the basis of the steering torque and assisting the steering operation is controlled so as to be driven by a main control system constituted by a main CPU 30, and is additionally provided with a sub control system constituted by the other sub CPU 40 monitoring the main control system.

A schematic block view of the main control system and the sub control system mentioned above is shown in FIG. 3.

First, in the main control system constituted by the main CPU 30, a steering assist control means 31 computes an assist base current Ib on the basis of a steering torque T detected by a steering torque sensor 20 and a vehicle speed v detected by a vehicle speed sensor 25 so as to output.

The assist base current Ib is a current forming a base for driving the assist motor 24, and is computed on the basis of enlarging the assist base current Ib in accordance with an increase of the steering torque T so as to lighten a load of a steering person, and since a wheel steering operation becomes heavier at a time when the vehicle speed is low than at a time when the vehicle speed is high in the same steering torque, the steering torque is lightened by enlarging the assist base current Ib.

The steering assist control means 31 computes a suitable assist base current Ib on the basis of the steering torque T and the vehicle speed v while taking the above matter into consideration.

For example, an optimum relation of the assist base current Ib with respect to the steering torque T is previously determined per a predetermined vehicle speed, and the assist base current Ib is computed from the steering torque T and the vehicle speed v on the basis of the relation.

Further, the assist base current Ib may be determined by adding a computation for compensating an inertia torque of a steering system and an inertia torque of a motor.

On the other hand, the damper current computing means 32 computes the damper current $\Delta I$ on the basis of the steering torque T and the vehicle speed v.

The damper current computing means 32 determines a torque change amount dT by time differentiating the steering torque T, and calculates the damper current $\Delta I$ corresponding to a differential current value by multiplying the torque change amount dT by a differential constant which is previously set in correspondence to the vehicle speed v.

In this case, the torque change amount dT can be determined as a difference obtained by subtracting a previous value from this time value of the steering torque T per a computing cycle (for example, 100 ms) by the main CPU 30.

The damper current $\Delta I$ calculated by the damper current computing means 32 is added to the assist base current Ib by the adding means 33 as mentioned above, whereby an assist target current Io is determined, and the assist target current Io is input to the current feedback control means 34.

A motor current Im detected by a motor current detecting apparatus 28 provided in the assist motor 24 is fed back and input to the current feedback control means 34.

Accordingly, the current feedback control means 34 executes a proportional-integral-derivative (PID) operation in such a manner as to set a difference between the assist target current Io and the fed-back motor current Im to 0, a drive current Id on the basis of a result of computation is output to a motor drive circuit 27, and the assist motor 24 is driven on the basis of a pulse-width-modulation (PWM) control of the motor drive circuit 27.

A description will be given below of the sub control system constituted by the sub CPU 40 monitoring the main control system, with respect to the main control system constituted by the main CPU 30 mentioned above.

The sub CPU 40 inputs the steering torque T detected by the torque sensor 20 and the motor current Im detected by the motor current detecting apparatus 28 so as to monitor the main CPU 30 on the basis of the steering torque T and the motor current Im, and determines whether or not it stops the drive of the assist motor 24.

Figure 5A:
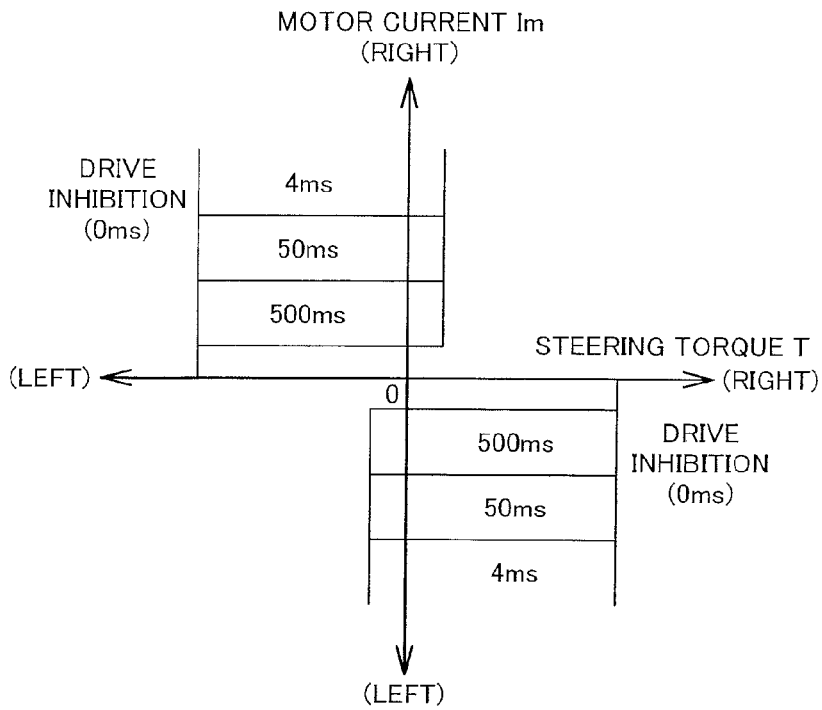
FIG. 5A and 5B are views showing a window time setting map.
Figure 5B:
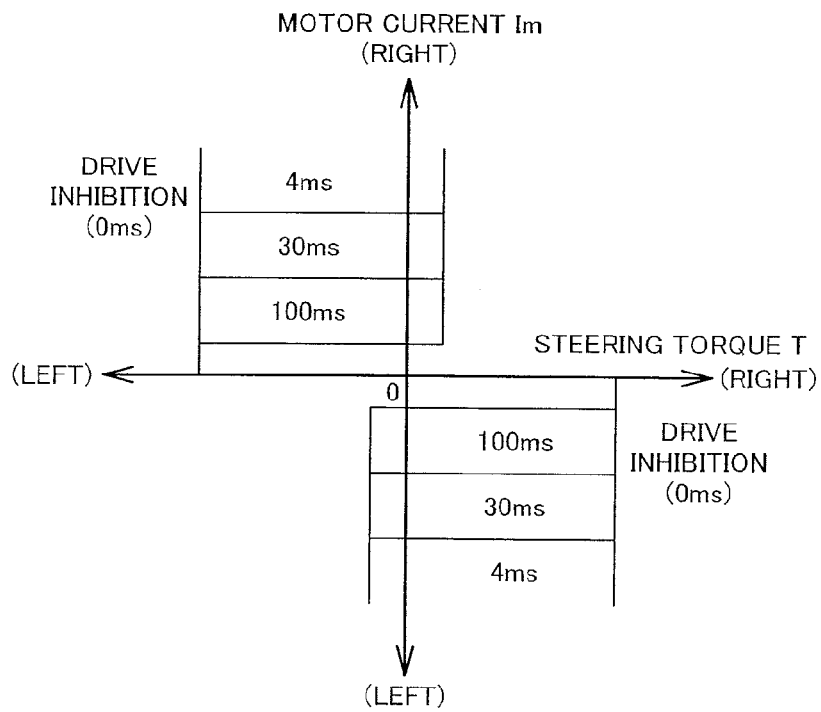

A map memory means 41 is attached to the sub control system constituted by the sub CPU 40, and there are stored two kinds comprising a first window time setting map M1 and a second window time setting map M2 which are previously prepared and shown in FIGS. 5A and 5B.

The window time setting maps M1 and M2 are constituted by a rectangular coordinate map having the steering torque T and the motor current Im as two variables and are provided for setting the window time for stopping the motor drive within a predetermined motor drive stop region.

In the window time setting maps M1 and M2, a horizontal axis is set to the steering torque T, a right side from the origin indicates a steering torque in a clockwise direction, a left side indicates a steering torque in a counterclockwise direction, a vertical axis is set to the motor current Im, an upper side from the origin 0 indicates a motor current Im generating an assist torque in a clockwise direction of the assist motor 24, and a lower side indicates a motor current Im generating an assist torque in a counterclockwise direction.

In the window time setting maps M1 and M2, a state in which the steering torque is T and the motor current is Im is indicated by a point coordinate (T, Im) corresponding to a combination of the steering torque T and the motor current Im.

In general, the point coordinate (T, Im) exists in a first quadrant and a third quadrant in which the direction of the steering torque T is identical to the direction of the assist torque generated by the motor current Im.

In other words, the assist torque of the assist motor 24 can assist the steering force of the driver on the basis of the existence of the point coordinate (T, Im) in the first quadrant and the third quadrant.

Accordingly, the point coordinate (T, Im) does not generally exist in a second quadrant and a fourth quadrant in which the direction of the steering torque T is different from the direction of the assist torque generated by the motor current Im, and if the situation mentioned above is generated, an abnormality of the main control system such as the fault of the main CPU 30 or the like is assumed. Accordingly, the second quadrant and the fourth quadrant are approximately assumed as a motor drive stop region.

However, since the present motor-driven power steering apparatus 1 has a damper current computing means 32 in the main CPU 30 and adds the damper current ΔI on the basis of the torque change amount dT to the assist base current Ib, the motor current Im value is inverted and the assist torque is applied to an opposite direction to the direction of the steering torque so as to apply a braking operation, thereby obtaining a steering damper effect, at a time of turning back the steering operation or the like.

Accordingly, there is a case that the point coordinate (T, Im) of the combination of the steering torque T and the motor current Im exists even within the motor drive stop region approximately corresponding to the second quadrant and the fourth quadrant.

However, this case exists in a transient state operating as the steering damper, and does not exist for a long time, window times t1 an t2 for stopping the motor drive are set here.

As shown in FIGS. 5A and 5B, in a first window time setting map M1 and a second window time setting map M2, a region in which the steering torque T is equal to or larger than a predetermined value within the motor drive stop region corresponds to a region (a drive inhibiting region) in which the motor drive is completely inhibited.

The other region than the drive inhibiting region within the motor drive stop region corresponds to a region in which the window time is set, and the window time setting region is separated into three regions by the motor current, and the window time is set shorter in accordance with the region in which the motor current is large.

The drive inhibiting region corresponds to a region in which the window time is 0 ms.

The first window time setting map M1 and the second window time setting map M2 have the same motor drive stop region and window time setting region, and within the window time setting region, the window time t1 in the first window time setting map M1 is set to 500 ms, 50 ms and 4 ms in the order that the motor current is smaller, and the window time t2 in the second window time setting map M2 is set to 100 ms, 30 ms and 4 ms in the order that the motor current is smaller.

In this case, 1 ms (millisecond) corresponds to 0.001 s (second).

The window time is shorter (t1≧t2) in the second window time setting map M2 in comparison with the first window time setting map M1, except the same minimum time 4 ms of the region having the large motor current.

In this case, the motor drive stop regions in the second quadrant and the fourth quadrant respectively protrude to the first quadrant and the third quadrant slightly, however, since the protruding region is a region in which the steering torque T is extremely small, it does not require the assistant torque, and becomes unstable all the more by driving the motor. Accordingly, the drive of the motor is stopped.

Further, the region in which the motor current is extremely small is removed from the window time setting region, to set the window time on the safe side and prevent the unstable drive control of the motor.

The map memory means 41 of the sub CPU 40 stores two kinds of window time setting maps comprising the first window time setting map M1 and the second window time setting map M2 as mentioned above (refer to FIG. 3).

The sub CPU 40 is provided with a torque change amount computing means 42 and a current change amount computing means 43, the torque change amount computing means 42 determines the torque change amount dT by time differentiating the steering torque T detected by the torque sensor 20, and the current change amount computing means 43 determines the current change amount dIm by time differentiating the motor current Im detected by the motor current detecting means 28.

The current change amount dIm is determined as a difference obtained by subtracting the previous value from this time value of the motor current Im per the computing cycle executed by the sub CPU 30.

Further, the sub CPU 40 is provided with decision inputs including a window time setting map selecting means 44, a window time deciding means 45 and a motor drive stop determining means 46, and the window time setting map selecting means 44 selects any window time setting map in two kinds of window time setting maps M1 and M2 stored by the map memory means 41 on the basis of the torque change amount dT and the current change amount dIm mentioned above, and the window time deciding means 45 collates the selected window time setting map with the point coordinate (T, Im) of the combination of the steering torque T and the motor current Im, and extracts the window time in the region in which the point coordinate (T, Im) exists.

The motor drive stop determining means 46 determines whether or not the point coordinate (T, Im) exists in the region continuously for the decided window time so as to output a motor drive stop coefficient C.

The motor drive stop coefficient C has a value 0 or 1, C=0 is set at a time of stopping the motor drive, and C=1 is set at the other times.

A procedure of the motor drive stop determining process in the sub CPU 40 mentioned above is shown by a flow chart in FIG. 4.

First, the step reads the motor current Im and the steering torque T (steps 1 and 2), and determines whether or not "1" is generated in a flag F (a step 3).

The flag F is set to "0" in the case that the first window time setting map is selected by the window time setting map selecting means 44 (a step 9), and "1" is generated in the flag F in the case that the second window time setting map is selected (a step 15).

The step goes to a step 4 if a relation F=0 is established in the step 3, and jumps to a step 14 if a relation F=1 is established, however, the flag F is originally set to "0", and the step goes to the step 4 from the step 3.

In the step 4, the current change amount dIm is calculated by time differentiating the motor current Im by the current change amount computing means 43, and the torque change amount dT is calculated by time differentiating the steering torque T by the torque change amount computing means 42 in the next step 5.

Further, the step determines whether or not the current change amount dIm calculated in the step 6 is equal to or more than a predetermined change amount dI1, the step jumps to the step 14. Alternatively, if it is equal to or more than the predetermined change amount dI1, the step goes to the step 7. If the current change amount dIm is smaller than the predetermined change amount dI1, the step 7 determines whether or not the torque change amount dT is equal to or more than a predetermined change amount dT1. The step jumps to the step 14 if it is equal to or more than the predetermined change amount dT1, and the step goes to the step 8 if the torque change amount dT is smaller than the predetermined change amount dT1.

In other words, in the case that the current change amount dIm and the torque change amount dT are both smaller than the predetermined change amount dI1 and dT1, the step goes to the step 8, and the first window time setting map M1 is selected by the window time setting map selecting means 44. Further, in the case that at least one of the current change amount dIm and the torque change amount dT is equal to or more than the predetermined change amount dI1 or dT1, the step jumps to the step 14, and the second window time setting map M2 is selected by the window time setting map selecting means 44.

If the first window time setting map M1 is selected in the step 8, the flag F is set to "0" (a step 9), and the step goes to a step 10, and if the second window time setting map M2 is selected in the step 14, "1" is generated in the flag F (a step 15), and the step goes to a step 16.

In the case that the current change amount dIm and the torque change amount dT are both smaller than the predetermined change amounts dI1 and dT1, the first window time setting map M1 is selected and the step goes to the step 10, to determine whether or not the point coordinate (T, Im) of the combination of the steering torque T and the motor current Im exists within the motor drive stop region in the first window time setting map M1.

If the point coordinate (T, Im) does not exist within the motor drive stop region, the step jumps to a step 12 that sets the motor drive stop coefficient C to 1 and returns to the step 1, and if the point coordinate (T, Im) exists within the motor drive stop region, the step goes to a step 11 and determines whether or not the point coordinate (T, Im) continuously exists in the region in which the point coordinate (T, Im) exists for a corresponding window time t1. If yes, the step goes to the step 12 until the window time t1 has passed, and returns to the step 1 while keeping the motor drive stop coefficient C=1, and in the case that the point coordinate (T, Im) continuously exists in the region in which the window time t1 is set for the window time t1, the step first goes to a step 13, sets the motor drive stop coefficient C to 0, determines to stop the motor drive, and finishes this iteration of the time motor drive stop determining process.

In this case, if the point coefficient (T, Im) deflects from the motor drive stop region before passing through the window time t1 in the region in which the window time t1 is set, the step jumps to the step 12 from the step 10, sets the motor drive stop coefficient C to 1 and returns to the step 1.

On the other hand, if at least one of the current change amount dIm and the torque change amount dT is equal to or more than the predetermined change amount dI1 and dT1, the second window time setting map M2 is selected (the step 14), "1" is generated in the flag F (the step 15), and the step goes to the step 16. Step 16 determines whether or not the point coordinate (T, Im) of the combination of the steering torque T and the motor current Im exists within the motor drive stop region in the second window time setting map M2.

If the point coordinate (T, Im) does not exists within the motor drive stop region, the stop jumps to a step 18, the step sets the flag F to 0, sets the motor drive stop coefficient C to 1 in a step 19 and returns to the step 1. Further, if the point coordinate (T, Im) exists within the motor drive stop region, the step goes to the step 17, determines whether or not it continuously exists in the region during the window time t2 corresponding to the region in which the point coordinate (T, Im) exists, goes to the step 19 until the window time t2 has passed, and returns to the step 1 while keeping the motor drive stop coefficient C=1. The step goes to a step 20 first at a time when the point coefficient (T, Im) continuously exists in the region in which the window time t2 is set for the window time t2, and the step sets the motor drive stop coefficient C to 0 so as to determine to stop the motor drive, sets the flag F to 0 (a step 21), and finishes this iteration of the time motor drive stop determining process.

In this case, if the point coordinate (T, Im) deflects from the motor drive stop region before passing through the window time t2 in the region in which the window time t2 is set, the step jumps to the step 18 from the step 16 so as to set the flag F to 0, sets the motor drive stop coefficient C to 1 (the step 19), and returns to the step 1.

Accordingly, if the second window time setting map M2 is selected (the step 14), "1" is generated in the flag F (the step 15), the point coordinate (T, Im) once enters into the window time setting region and the window time t2 is set, the flag F=1 is established until deflecting from the motor drive stop region, the stop jumps to the step 14 from the step 3, and the second window time setting map M2 is maintained.

On the contrary, even if the first window time setting map M1 is selected (the step 8), the flag F is set to "0" (the step 9), the point coordinate (T, Im) enters into the window time setting region, and the window time t1 is set, if at least one of the current change amount dim and the torque change amount dT becomes equal to or more than the predetermined change amount dI1 or dT1, the first window map M1 is not maintained, but is changed to the second window time setting map M2.

Figure 3:
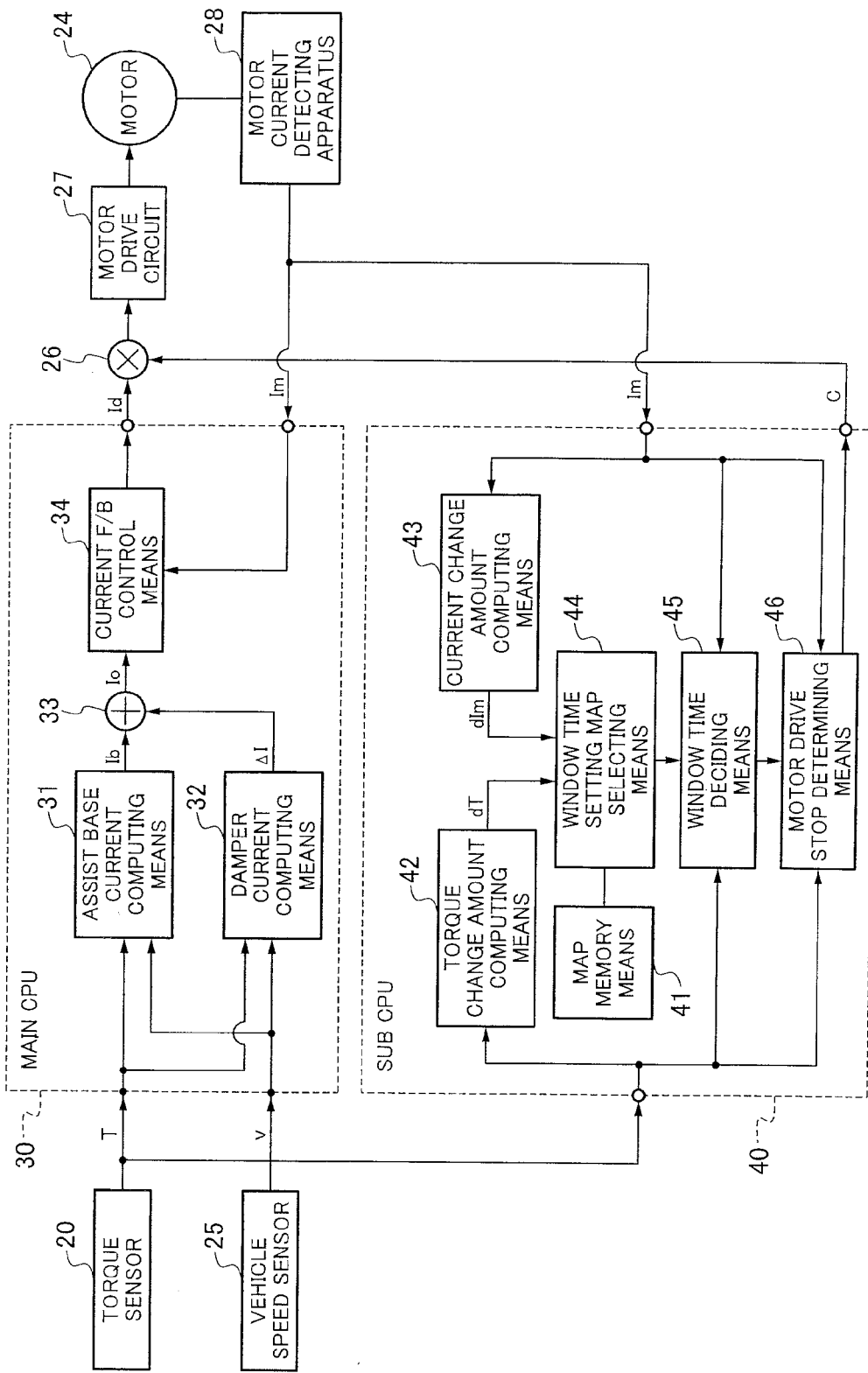
FIG. 3 is a schematic block diagram of a main control system and a sub control system.
Figure 4:
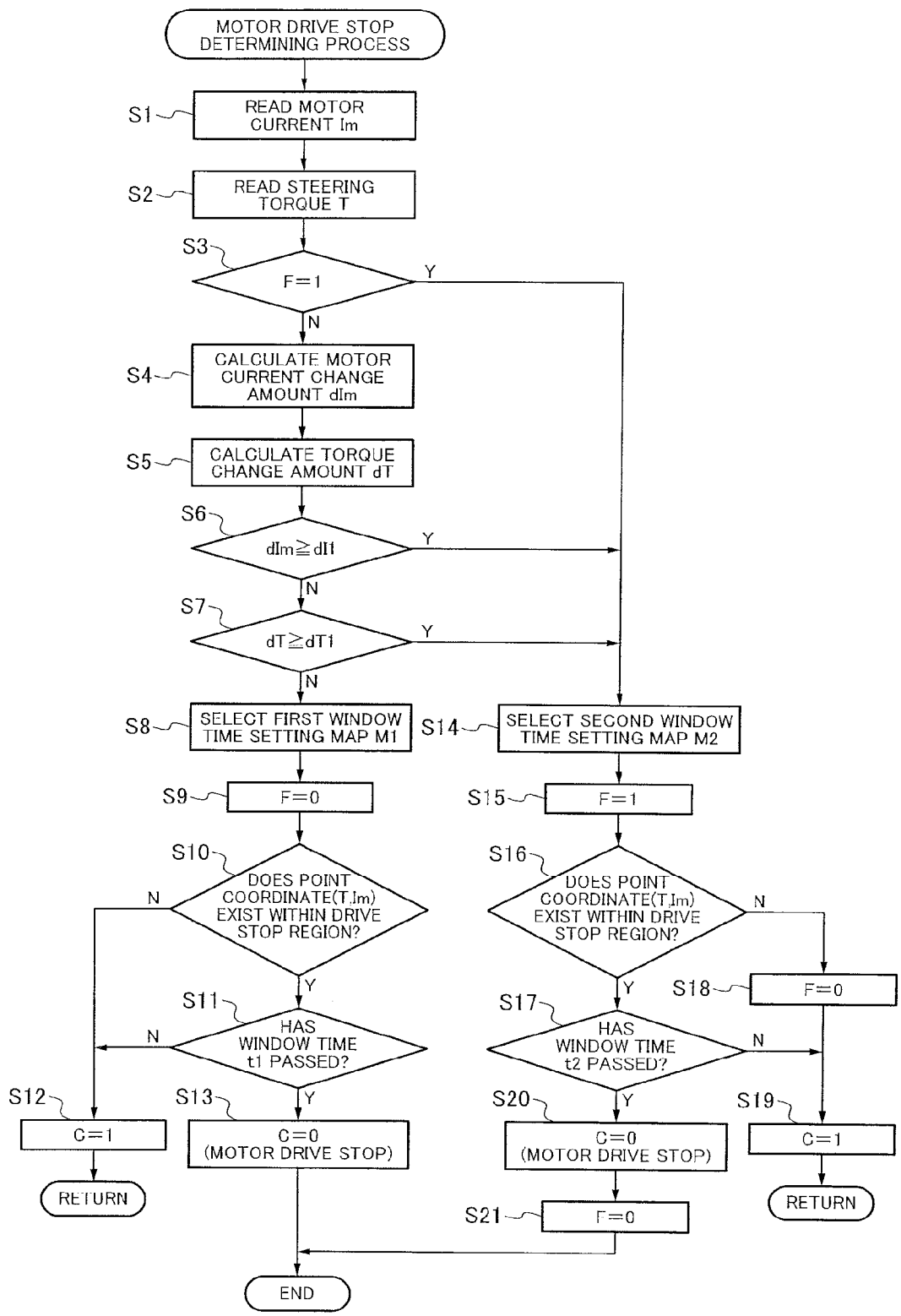
FIG. 4 is a flow chart showing a procedure of a motor drive stop determining process in a sub CPU.

As mentioned above, the motor drive stop coefficient C corresponding to the result of determination of the motor drive stop in the sub CPU 40 is output to the multiplying means 26 from the motor drive stop determining means 46 (refer to FIG. 3).

With reference to FIG. 3, the drive current Id output from the current feedback control means 34 of the main CPU 30 is multiplied by the motor drive stop coefficient C by the multiplying means 26, and a result of multiplication Id·C is output to the motor drive circuit 27.

Accordingly, in the case that the motor drive stop determining means 46 determines the motor drive stop, and the motor drive stop coefficient C is set to "0", the drive current Id comes to 0 on the basis of the multiplication of the motor drive stop coefficient C, and the assist motor 24 stops driving.

Since the drive current Id is multiplied by the motor drive stop coefficient C to which "1" is set as far as the motor drive stop determining means 46 does not determine the motor drive stop, the result of multiplication is output to the motor drive circuit 27 while keeping Id, and the assist motor 24 is driven in accordance with the PWM control on the basis of the drive current Id.

In the case that the point coordinate (T, Im) of the combination of the steering torque T and the motor current Im exists in the window time setting region of the window time setting maps M1 and M2 (the region in which the direction of the steering torque is inverse to the direction of the assist torque generated by the motor current of the motor) and the window times t1 and t2 are set, it is possible to apply the brake to the steering so as to achieve the steering damper effect by carrying over the motor drive until passing through the window times t1 and t2.

Further, in the case that the current change amount dIm and the torque change amount dT are both smaller than the predetermined change amount dI1 and dT1 in the sub CPU 40 provided separately from the main CPU 30, the time setting map selecting means 44 selects the first window time setting map M1, and selects the second window time setting map M2 in which the window time is set shorter in the other cases. Accordingly, in the case that at least one of the current change amount dIm and the torque change amount dT is equal to or more than the predetermined change amounts dI1 and dT1 and the behavior tends to be generated in the steering, it is possible to shorten the window time so as to stop the driving operation of the assist motor 24 for a short time and prevent an unnatural behavior from being generated in the steering operation.

Accordingly, even in the case that the system abnormality is generated in the main control system of the main CPU 30, it is possible to prevent the unnatural behavior of the steering for a short time.

For example, in the case of turning back the steering from the clockwise direction to the counterclockwise direction, the clockwise steering torque T is reduced to 0, and the counterclockwise steering torque is next going to be increased, however, there is a case that the motor current Im is reduced to be dIm<0 and the motor current Im is reversed to the assist torque in the counterclockwise direction in the process that the clockwise steering torque T is reduced. Accordingly, the point coordinate (T, Im) of the combination of the steering torque T and the motor current Im appears in the window time setting region of the fourth quadrant of the window time setting maps M1 and M2.

In the case that the current change amount establishes dIm<dI1 and the torque change amount establishes dT<dT1, if the point coordinate (T, Im) exists in the region of the window time 500 ms of the first window time setting map M1, the assist torque is applied in the opposite direction to the steering torque T by driving the motor without stopping for the window time 500 ms, the damper effect is achieved on the basis of the braking operation, and the drive of the motor is stopped at a time point passing through the window time 500 ms.

In the case that the behavior tends to be generated in the steering at the current change amount dIm≧dT1 or the torque change amount dT≧dT1, the point coordinate (T, Im) exists in the window time 100 ms of the second window time setting map M2, the window time t2 (<t1) is shortened, and the braking time becomes short, however, it is possible to stop the drive of the assist motor 24 for a short time so as to prevent the unnatural behavior from being generated in the steering.

Even in the case that the system abnormality is generated in the main control system of the main CPU 30, and there is a fear that the motor current is abnormally increased and the great behavior is generated in the steering, it is possible to make the window time stopping the drive of the assist motor 24 shorter and shorter, and it is possible to prevent the unnatural behavior of the steering by stopping the motor drive for a short time.

Further, since the window time setting region of the window time setting maps M1 and M2 is divided by the motor current Im, and the shorter window times t1 and t2 correspond to the respectively divided regions in accordance that the motor current Im in the region is greater, it is possible to suppress the unnatural behavior of the steering as much as possible by making the window times t1 and t2 for stopping the motor drive shorter in the region in which the motor current Im is great and the behavior of the steering appears greatly at the system abnormal time of the main control system or the like, and determining for a short time so as to stop the drive of the assist motor 24.

In accordance with the motor-driven power steering apparatus described in the first aspect, since the first window time setting map is selected at a time when the torque change amount and the current change amount are both smaller than the predetermined change amounts, and the second window time setting map in which the window time is set shorter is selected in the other cases, by the window time setting map selecting means, the window time for stopping the motor drive is always applied at a desired time in spite of being long and short, and a necessary steering damper effect can be expected, and in the case that at least one of the torque change amount and the current change amount is large and the behavior is hard to be generated in the steering, it is possible to prevent the unnatural behavior from being generated in the steering by shortening the window time and stopping the drive of the motor for a short time.

Accordingly, even in the case that the system abnormality is generated in the main control system, it is possible to prevent the unnatural behavior of the steering.

In accordance with the motor-driven power steering apparatus described in the second aspect, since the motor drive stop regions in the first window time setting map and the second window time setting map mainly exist in the regions in which the direction of the steering torque is inverse to the direction of the assist torque generated by the motor current of the motor, it is possible to assist the steering force without stopping the motor drive at a time of the normal turn-in time, and it is possible to apply the steering damper by driving the motor drive for the window time at a time of turning back the steering or the like and thereafter stopping.

In accordance with the motor-driven power steering apparatus described in the third aspect, since the shorter window time corresponds to the region having the larger motor current in each of the divided regions of the region in which the window time is set, it is possible to suppress the unnatural behavior of the steering as much as possible by making the window time for stopping the motor drive shorter in the region in which the motor current is large and the behavior of the steering appears largely at a time of the system abnormality or the like, and stopping the motor drive for a short time.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus provided with a steering assist control means calculating an assist base current value on the basis of a steering torque and a vehicle speed, and a damper current computing means computing a damper current on the basis of at least a change amount of the steering torque, and constructing a main control system assisting a human power by controlling so as to drive a motor in accordance with an assist target current determined on the basis of a current obtained by adding the damper current to the assist base current, wherein the motor-driven power steering apparatus is provided with a sub control system, comprising:
   a map memory means storing a first window time setting map with a first window time and a second window time setting map with a second window time in which the second window time is set shorter than the first window time, as a widow time setting map corresponding to a coordinate map having two variables including a steering torque and a motor current and in which a window time for stopping the motor drive is set within a predetermined motor drive stop region;
   a torque change amount computing means calculating a torque change amount by differentiating the steering torque;
   a current change amount computing means calculating a current change amount by differentiating the motor current;
   a window time setting map selecting means selecting the first window time setting map at a time when the torque change amount and the current change amount are both smaller than respective predetermined change amounts, and selecting the second window time setting map in the other cases;
   a window time deciding means collating a point coordinate of a combination of the steering torque and the motor current with the window time setting map selected by the window time setting map selecting means so as to extract and decide the corresponding window time in the case that the point coordinate exists in the motor drive stop region; and
   a motor drive stop determining means determining the motor drive stop in the case that the point coordinate of the combination of the steering torque and the motor current continuously exists in the region corresponding to the decided window time for the window time, and
   wherein when the motor drive stop determining means of the sub control system determines the motor drive stop, the drive of the motor controlled so as to be driven by the main control system is stopped.

2. A motor-driven power steering apparatus as claimed in claim 1, wherein the motor drive stop region in the first window time setting map and the second window time setting map stored by the map memory means mainly exists in a region in which the direction of the steering torque is inverse to the direction of the assist torque generated by the motor current of the motor.

3. A motor-driven power steering apparatus as claimed in claim 2, wherein the first window time setting map and the second window time setting map stored by the map memory means have the same motor drive stop region,
   wherein the region in which the first and second window times are set in the motor drive stop region is divided into a plurality of regions in correspondence to the motor current, and the first and second window times for stopping the motor drive are set in correspondence to each of the regions, and
   wherein the shorter of the first and the second window times corresponds to the region having the larger motor current in the respective divided regions of the region in which the window times are set.

4. A motor-driven power steering apparatus as claimed in claim 3, wherein the steering assist control means previously determines an optimum relation of an assist base current with respect to the steering torque per a predetermined vehicle speed, and computes an assist base current from the steering torque and the vehicle speed on the basis of the relation.

5. A motor-driven power steering apparatus as claimed in claim 4, wherein the steering assist control means determines the assist base current by adding a computation for compensating an inertia torque of a steering system and an inertia torque of the motor.

6. A motor-driven power steering apparatus as claimed in claim 4, wherein the damper current computing means determines the torque change amount by time differentiating the steering torque, and calculates the damper current corresponding to a differential current value by multiplying the torque change amount by a differential constant previously set in correspondence to the vehicle speed.

7. A motor-driven power steering apparatus as claimed in claim 4, wherein the first and second window time setting maps are structured such that a horizontal axis is set to the steering torque, a right side from the origin indicates a steering torque in a clockwise direction, a left side indicates a steering torque in a counterclockwise direction, a vertical axis is set to the motor current, an upper side from the origin indicates a motor current generating an assist toque in a clockwise direction of the assist motor, and a lower side indicates a motor current generating an assist torque in a counterclockwise direction.

8. A motor-driven power steering apparatus as claimed in claim 3, wherein the damper current computing means determines the torque change amount by time differentiating the steering torque, and calculates the damper current corresponding to a differential current value by multiplying the torque change amount by a differential constant previously set in correspondence to the vehicle speed.

9. A motor-driven power steering apparatus as claimed in claim 3, wherein the first and second window time setting maps are structured such that a horizontal axis is set to the steering torque, a right side from the origin indicates a steering torque in a clockwise direction, a left side indicates a steering torque in a counterclockwise direction, a vertical axis is set to the motor current, an upper side from the origin indicates a motor current generating an assist toque in a clockwise direction of the assist motor, and a lower side indicates a motor current generating an assist torque in a counterclockwise direction.

10. A motor-driven power steering apparatus as claimed in claim 2, wherein the steering assist control means previously determines an optimum relation of an assist base current with respect to the steering torque per a predetermined vehicle speed, and computes an assist base current from the steering torque and the vehicle speed on the basis of the relation.

11. A motor-driven power steering apparatus as claimed in claim 10, wherein the steering assist control means determines the assist base current by adding a computation for compensating an inertia torque of a steering system and an inertia torque of the motor.

12. A motor-driven power steering apparatus as claimed in claim 10, wherein the damper current computing means determines the torque change amount by time differentiating the steering torque, and calculates the damper current corresponding to a differential current value by multiplying the torque change amount by a differential constant previously set in correspondence to the vehicle speed.

13. A motor-driven power steering apparatus as claimed in claim 10, wherein the first and second window time setting maps are structured such that a horizontal axis is set to the steering torque, a right side from the origin indicates a steering torque in a clockwise direction, a left side indicates a steering torque in a counterclockwise direction, a vertical axis is set to the motor current, an upper side from the origin indicates a motor current generating an assist toque in a clockwise direction of the assist motor, and a lower side indicates a motor current generating an assist torque in a counterclockwise direction.

14. A motor-driven power steering apparatus as claimed in claim 2, wherein the damper current computing means determines the torque change amount by time differentiating the steering torque, and calculates the damper current corresponding to a differential current value by multiplying the torque change amount by a differential constant previously set in correspondence to the vehicle speed.

15. A motor-driven power steering apparatus as claimed in claim 2, wherein the first and second window time setting maps are structured such that a horizontal axis is set to the steering torque, a right side from the origin indicates a steering torque in a clockwise direction, a left side indicates a steering torque in a counterclockwise direction, a vertical axis is set to the motor current, an upper side from the origin indicates a motor current generating an assist toque in a clockwise direction of the assist motor, and a lower side indicates a motor current generating an assist torque in a counterclockwise direction.

16. A motor-driven power steering apparatus as claimed in claim 1, wherein the steering assist control means previously determines an optimum relation of an assist base current with respect to the steering torque per a predetermined vehicle speed, and computes an assist base current from the steering torque and the vehicle speed on the basis of the relation.

17. A motor-driven power steering apparatus as claimed in claim 16, wherein the steering assist control means determines the assist base current by adding a computation for compensating an inertia torque of a steering system and an inertia torque of the motor.

18. A motor-driven power steering apparatus as claimed in claim 16, wherein the damper current computing means determines the torque change amount by time differentiating the steering torque, and calculates the damper current corresponding to a differential current value by multiplying the torque change amount by a differential constant previously set in correspondence to the vehicle speed.

19. A motor-driven power steering apparatus as claimed in claim 16, wherein the first and second window time setting maps are structured such that a horizontal axis is set to the steering torque, a right side from the origin indicates a steering torque in a clockwise direction, a left side indicates a steering torque in a counterclockwise direction, a vertical axis is set to the motor current, an upper side from the origin indicates a motor current generating an assist toque in a clockwise direction of the assist motor, and a lower side indicates a motor current generating an assist torque in a counterclockwise direction.

20. A motor-driven power steering apparatus as claimed in claim 1, wherein the damper current computing means determines the torque change amount by time differentiating the steering torque, and calculates the damper current corresponding to a differential current value by multiplying the torque change amount by a differential constant previously set in correspondence to the vehicle speed.

21. A motor-driven power steering apparatus as claimed in claim 1, wherein the first and second window time setting maps are structured such that a horizontal axis is set to the steering torque, a right side from the origin indicates a steering torque in a clockwise direction, a left side indicates a steering torque in a counterclockwise direction, a vertical axis is set to the motor current, an upper side from the origin indicates a motor current generating an assist toque in a clockwise direction of the assist motor, and a lower side indicates a motor current generating an assist torque in a counterclockwise direction.

* * * * *